United States Patent

[11] 3,633,391

[72] Inventors: Rudolf Andres, Sindelfingen; Hermann Moller, Aidlingen (Wurttemberg), both of Germany
[21] Appl. No.: 840,294
[22] Filed: July 9, 1969
[45] Patented: Jan. 11, 1972
[73] Assignee: Daimler-Benz Aktiengesellschaft Stuttgart-Unterturkheim, Germany
[32] Priority: July 9, 1968
[33] Germany
[31] P 17 03 758.0

[54] INSTALLATION AT LOCKING MECHANISMS, ESPECIALLY IN MOTOR VEHICLES, OPERATING WITH VACUUM
8 Claims, 4 Drawing Figs.

[52] U.S. Cl. .................................................. 70/264
[51] Int. Cl. ............................................... E05b 53/00
[50] Field of Search ........................................... 70/264, 275; 137/384.2, 384.8; 292/144, 201

[56] References Cited
UNITED STATES PATENTS
3,357,215  12/1967  Riester et al. ................ 70/264
FOREIGN PATENTS
916,345  1/1963  Great Britain ................ 70/264

Primary Examiner—Albert G. Craig, Jr.
Attorney—Craig, Antonelli & Hill

ABSTRACT: An installation for the central locking and unlocking and/or actuation of several locking mechanisms arranged in vehicles, especially in motor vehicles, in which central unlocking and locking takes place during boarding and leaving of the vehicle by the unlocking or locking of a front door; additionally, each vehicle door is adapted to be unlocked mechanically from the inside of the vehicle in its centrally locked condition and the central locking and unlocking can also be carried out from a place accessible to the driver within the passenger space.

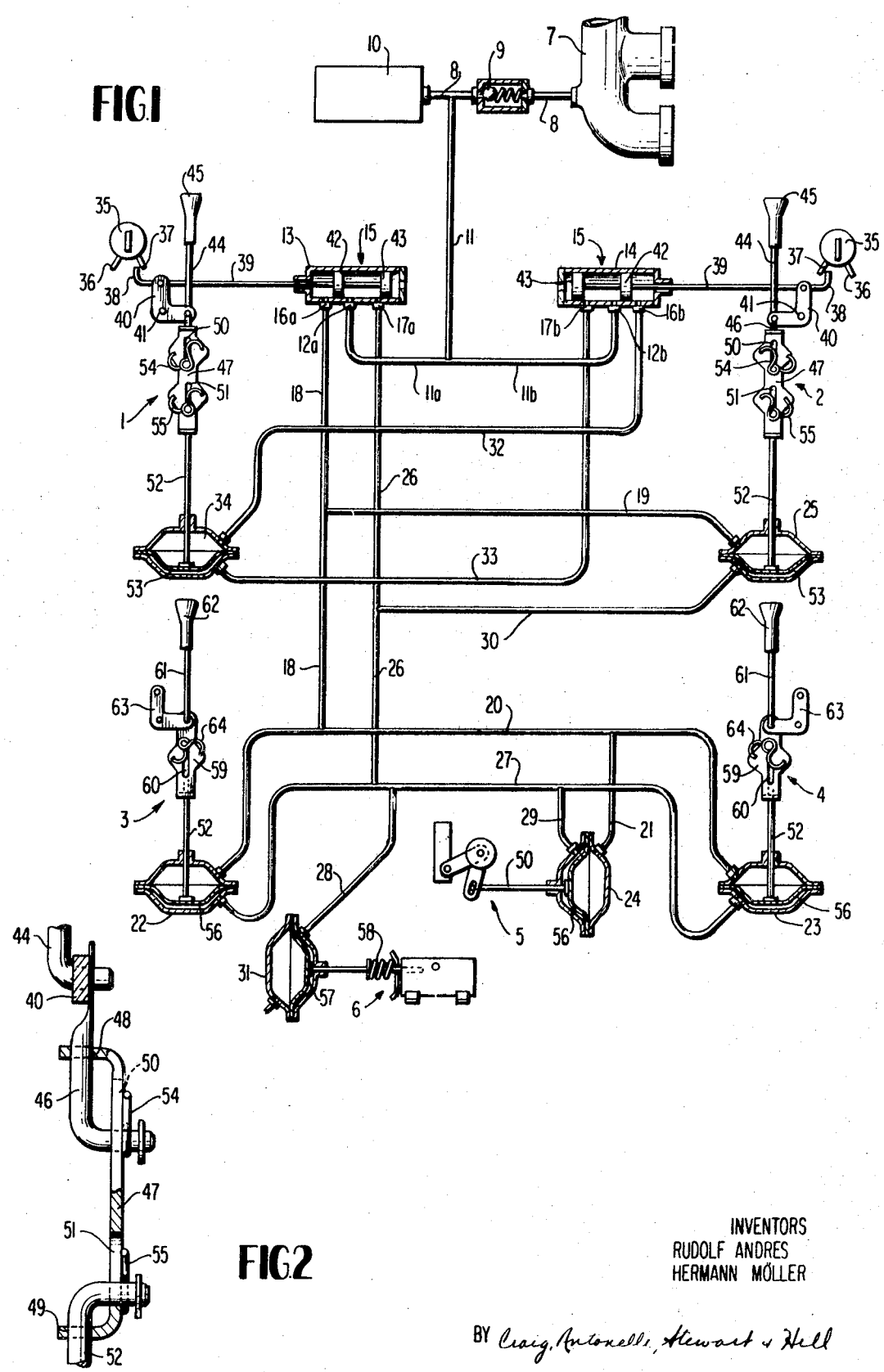

INSTALLATION AT LOCKING MECHANISMS, ESPECIALLY IN MOTOR VEHICLES, OPERATING WITH VACUUM

The present invention relates to an installation, operating with vacuum, for the central locking and unlocking and/or actuation of several locking mechanisms arranged in vehicles, especially in motor vehicles.

A construction is already known in the German Pat. No. 1,162,717 in which during the unlocking and locking of the driver's door, an automatic unlocking or locking of the vehicle doors takes place by a common shifting valve. The codriver's door, i.e., the door of the passenger seated alongside the driver, can be mechanically unlocked thereby in the centrally locked condition only from the inside whereas an unlocking of the rear doors is not possible in the engaged centrally locked condition.

However, it is oftentimes necessary to actuate the installation for the central locking also from the codriver's door, i.e., from the door opposite the driver's door if, for example, adjacent to a parked motor vehicle a further vehicle stands so close to the driver's door of the first parked motor vehicle that a boarding is possible only by way of the codriver's door. The term "codriver" will be used in the specification and claims of this application to designate the door for the passenger seated alongside the driver, i.e., in a four-door motor vehicle, the front door opposite the driver's door.

Furthermore, driving situations may arise in which it becomes necessary to mechanically unlock the rear doors from the inside in bypassing relationship to the central locking action.

These concepts are realized by the present invention so that the central unlocking and locking takes place during boarding or leaving of the motor vehicle by the unlocking or locking of a front vehicle door, in that each of the vehicle doors is adapted to be mechanically unlocked from the inside in the centrally locked condition, and in that the central locking and unlocking can be realized also from a place in the passenger space accessible to the driver.

According to a further feature and development of the present invention during the unlocking or locking of a front vehicle door, a lock cylinder is rotated whose rotary movement is converted by conventional means into a stroke movement which serves for the shifting control of a switch or shifting means that is actuated electrically or by means of a vacuum.

In one embodiment of the present invention, a servomotor operated by vacuum and bringing about the automatic locking or unlocking, is coordinated to the driver and codriver door and to each other locking mechanism whereby upon actuation of the lock cylinder or of an inwardly disposed locking knob at the driver door or at the codriver door, depending on the actuating direction thereof, a control device constructed as shifting valve is so influenced that thereafter a central locking or unlocking of all doors and other locking mechanisms takes place.

In another embodiment of the present invention, during the actuation of the lock cylinder or of a locking knob disposed on the inside at the driver door, there takes place a shifting control of a control device constructed as valve and of a servomotor mechanically connected therewith which is connected by way of lines with a pulse valve actuatable by the lock of the codriver door.

In a further embodiment according to the present invention during the actuation of the lock cylinder or of an inwardly disposed locking knob at the driver door, there takes place a mechanical shifting of a control device which is constructed as valve that is provided with two electric coils which are adapted to be selectively energized by the lock cylinder at the codriver door in conjunction with a shifting switch and a relay coordinated thereto whereby an electric shifting of the valve takes place.

Accordingly, it is an object of the present invention to provide an installation for the central locking and unlocking of vehicle doors and other locking mechanisms in motor vehicles, operable by means of a vacuum, which obviates by simple means the aforementioned shortcomings and drawbacks encountered in the prior art.

Another object of the present invention resides in a central locking and unlocking installation, especially in motor vehicles, in which the central locking and unlocking mechanism can be operated also from the codriver door.

A further object of the present invention resides in a central locking and unlocking installation for the locking mechanism of vehicles, especially of motor vehicles, which can be actuated from either side of the vehicle so as to render the vehicle accessible for boarding from either side even though the central locking mechanism has been actuated prior to leaving the vehicle.

Still another object of the present invention resides in a central locking and unlocking installation for motor vehicles in which the rear doors of the motor vehicle can be mechanically unlocked from the inside even though the central locking mechanism is in the locked condition.

These and other objects, features, and advantages of the present invention will become more obvious from the following description when taken in connection with the accompanying drawing which shows, for purposes of illustration only, several embodiments in accordance with the present invention, and wherein:

FIG. 1 is a schematic view of an installation in accordance with the present invention in the locked condition thereof, in which the central locking of the vehicle doors and of other locking mechanisms is initiated by two control valves;

FIG. 2 is a side view, on an enlarged scale, of an entrainment plate which is arranged between the locking and unlocking rod and the servomotor of a front vehicle door according to FIG. 1;

Figure 3:
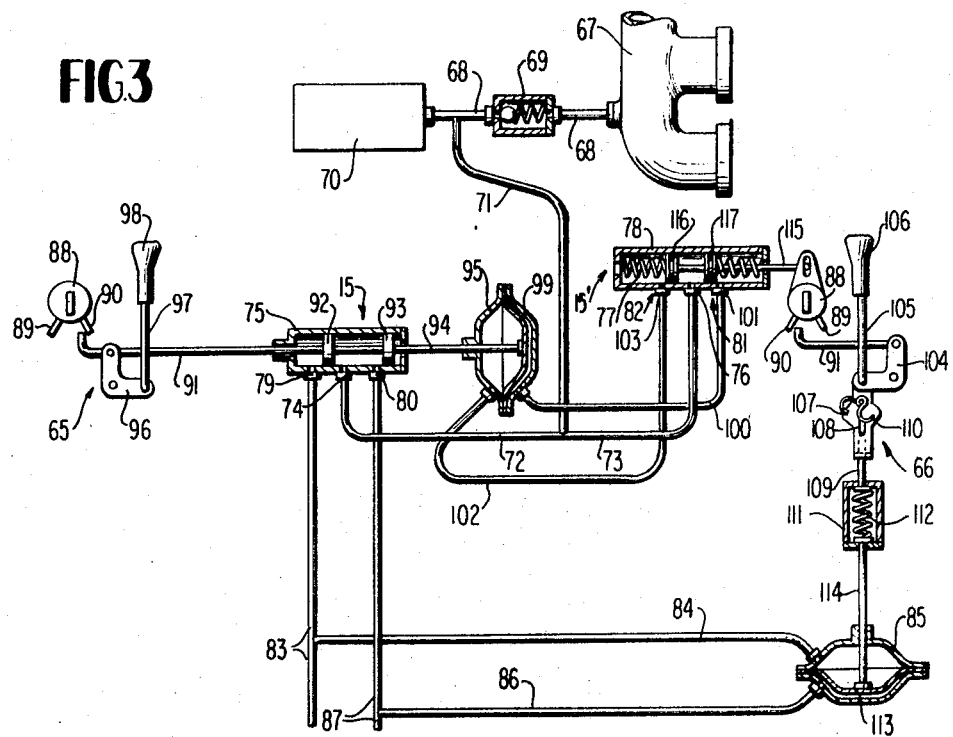
Figure 4:
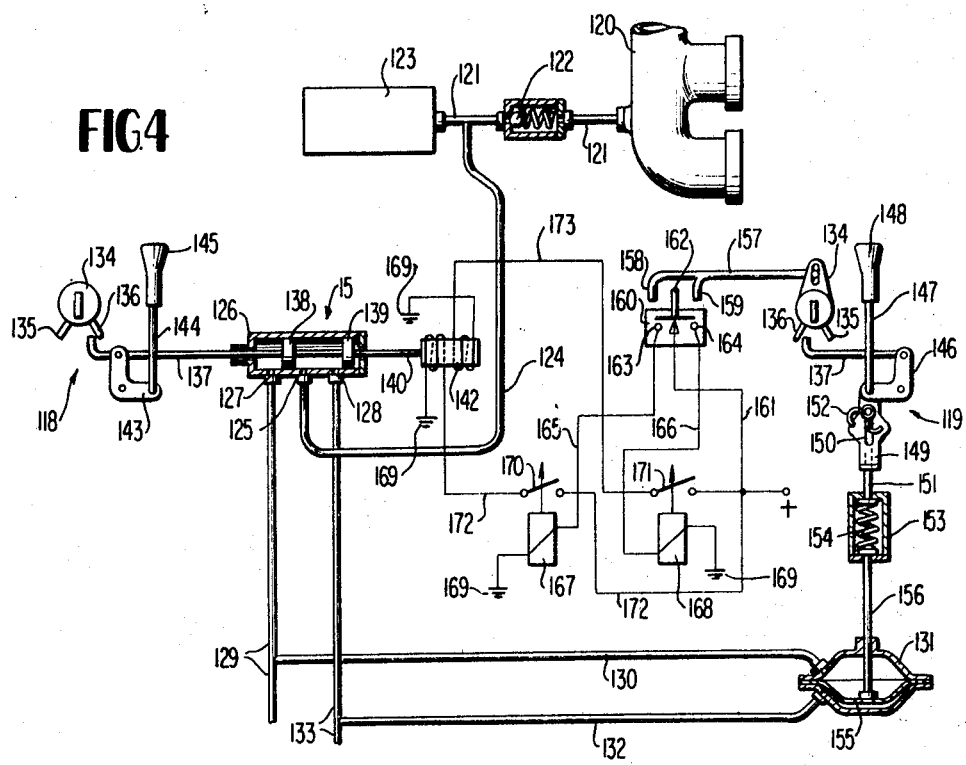

FIG. 3 is a partial schematic view of a modified embodiment of an installation in accordance with the present invention in which a control device constructed as valve is used together with a mechanically connected servomotor and an impulse valve for the initiation of the central locking; and FIG. 4 is a partial schematic view of a still further modified embodiment of an installation in accordance with the present invention with only one valve which can be shifted both mechanically as well as electrically.

Referring now to the drawing wherein like reference numerals are used throughout the various views to designate like parts and more particularly to FIG. 1, the central locking installation for the locks generally designated by reference numerals 1 to 4 of the doors (not shown), for the lock generally designated by reference numeral 5 of the luggage space and for the lock generally designated by reference numeral 6 of the tank lid is actuated by means of vacuum as auxiliary force. For that purpose, the suction pipe 7 of an internal combustion engine (not shown) of any conventional construction is tapped by means of a line 8 which leads by way of a check valve 9 to a storage or reservoir tank 10. A line 11 branching off from the line 8 subdivides into two line sections 11a and 11b, each leading, respectively, to a center tap 12a and 12b of a control device generally designated by reference numeral 15 and constructed as shifting valves 13 and 14. In addition to the center taps 12a and 12b, the shifting valves 13 and 14 are each provided with two further connections 16a, 17a and 16b, 17b, respectively. A line 18 with line sections 19, 20, and 21 branching-off therefrom leads from the connection 16a to one chamber of a respective one of servomotors 22, 23, 24 and 25 whereas the connection 17a is the start for a line 26 with branching-off line sections 27 to 30 which lead to the other chamber of the servomotor 22 to 25 and to a further servomotor 31 whose chamber, not connected with the line network, is in communication with the atmospheric air. Line 32 and 33, which do not branch off, are connected to the connections 16b and 17b and lead to two oppositely disposed chambers of a servomotor 34, respectively.

Both the lock 1 at the driver door (not shown) as also the lock 2 at the codriver door (also not shown) each includes a lock cylinder 35 of conventional construction with two downwardly projecting entrainment members 36 and 37. The end 38 of a locking rod 39, bent upwardly toward the lock cylinder 35, engages between the entrainment members 36 and 37. One leg portion of a bellcrank 40 is pivotally connected with the locking rod 39 and is pivotally arranged at the lock housing (not shown) by means of a fixed conventional bearing place 41. The locking rod 39 forms in its rectilinear extension the piston rod with the piston 42 and 43 of a respective shifting valve 13 and 14. The other leg portion of each bellcrank 40 is pivotally connected to a locking or unlocking rod 44 having an actuating knob 45 at the upper end thereof.

As can be seen in particular from FIG. 2, the unlocking rod 44 is bent at about right-angle at the end thereof opposite the actuating knob 45 and, in addition to the bellcrank 40, receives or is operatively connected with an also bent, intermediate rod 46 which, in its turn, acts on an approximately U-shaped entrainment plate 47. The two leg portions of the entrainment plate 47 are provided each with a bore 48 and 49, respectively, whereas the web portion thereof is provided with two elongated apertures 50 and 51. As a result thereof, both the intermediate rod 46 as also a unilaterally bent actuating rod 52 are guided in the entrainment plate 47. The other end of the actuating rod 52 (FIG. 1) is connected with a diaphragm 53 by means of which the two servomotors 25 and 34 are divided into two chambers separated from each other in airtight manner. The center part of a spring 54 and 55, each with two leg portions, is arranged at the bent end of the intermediate rod 46 and of the actuating rod 52, respectively, whereby the leg ends are anchored in the entrainment plate 47.

Further details of the locking installation illustrated in the centrally locked condition, which can be seen from FIG. 1, will be explained in detail hereinafter in conjunction with the sequence of a central unlocking operation.

If, for example, the lock cylinder 35 of the lock 1, acting on the driver door, is rotated in the clockwise direction, as viewed in FIG. 1 which can take place by means of a key, then the entrainment member 37 seizes the bent-up end 38 of the locking rod 39. As a result thereof, on the one hand, the control valve 13 is shifted into its other position, and on the other, the actuating knob 45 is lifted because by reason of the force introduced by way of the bellcrank 40, the intermediate rod 46 snaps over with its angularly bent end up to the upper limit of the elongated aperture 50 against the force of spring 54. The pistons 42 and 43 of the shifting valve 13 are so displaced by the locking rod 39 that the center tap 12a and the connection 16a are in communication with each other. An unlocking of the locks 2 to 6 takes place thereby because as a result of the actuation with vacuum of the corresponding chambers of the servomotors 22, 23, 24, and 25, the diaphragms 53 to 56 thereof together with the respective actuating rods 52 connected therewith carry out a stroke movement. The locking mechanism 6 of the tank lid also opens because the diaphragm 57 of the associated servomotor 31 is forced back by the force of a spring 58. During the unlocking operation of the locks 3 and 4 of the rear doors (not illustrated), the actuating rods 52 which are bent at the ends thereof opposite the diaphragms 56 and are guided in an entrainment plate 59 with elongated aperture 60, take along the entrainment plate 59 whereby an unlocking and locking rod 61 together with its actuating knob 62 and a bellcrank 63 acting on the locking installation in a conventional manner, not illustrated in detail, are moved or displaced.

During the ensuing unlocking of the lock 2 at the codriver door, there takes place, starting from the diaphragm 53 and the actuating rod 52 by way of the entrainment plate 47, the intermediate rod 46 and the bellcrank 40, a displacement of the locking rod 39 with the pistons 42 and 43 in such a manner that the center tap 12b is brought into communication with the connection 16b. As a result of the application to the upper chamber of the servomotor 34 of a vacuum, which now occurs, the diaphragm 53 thereof and therewith also the actuating rod 52 moves upwardly whereby a snapping over of the spring 55 occurs so that in the unlocked condition of the lock 1, the bent end of the actuating rod 52 and of the intermediate rod 46 now abut each at the upper end of the elongated aperture 50 and 51, respectively.

The same sequence of operation as during the central unlocking occurs when the locking installation is actuated from the inside of the vehicle by pulling up the actuating knob 45 at the driver door. In that case, at first the lock 2 at the codriver door is opened, and simultaneously therewith, there takes place a shifting of the control valve 14. Thereupon, the lock 1 at the driver door is opened whereby the control valve 13 is so shifted that thereafter all other locks reach the open position thereof.

The central locking operation, which can be initiated both from the driver door as also from the codriver door by corresponding rotation of the lock cylinder 35 or by pushing down the actuating knob 45, takes place in the reverse sequence of the central unlocking operation already described.

By the construction of the entrainment plates 59 at the rear doors with an elongated aperture 60 in combination with the actuating rods 52 and a spring 64 acting on the bent ends thereof, and having two leg portions it is possible to unlock each rear door for itself. During pulling up of the actuating knob 62, the entrainment plate 59 is also displaced upwardly whereby the spring 64 connected with the actuating rod 52 snaps over because the spring force thereof is smaller than the force by means of which the diaphragm 56 is actuated.

The central locking installation according to FIG. 3, in which the actuating installation for the locks 65 and 66 of the front vehicle doors (not shown) is visible, is operated by means of vacuum and is illustrated in the centrally locked condition. The suction pipe 67 of a conventional internal combustion engine (not shown) is tapped by means of a line 68 which leads, by way of a check valve 69, to a storage or reservoir tank 70. A line 71 branches off from the line 68 which subdivides into two line sections 72 and 73. The line section 72 leads to a center tap 74 of a control device generally designated by reference numeral 15 and constructed as valve 75 and the line section 73 leads also to a center tap 76 of a control device generally designated by reference numeral 15 which is spring-loaded by a spring 77 and constructed as impulse valve 78. The valve 75 is further provided with two connections 79 and 80, and the impulse valve 78 with two connections 81 and 82. A line 83—corresponding to line 18 of FIG. 1—leads from the connection 79 to the various servomotors, not illustrated in this Figure but visible in FIG. 1, for the locks of the rear doors and to the other locking mechanisms. A line 84 branching off from line 83 leads to the upper chamber of a servomotor 85 whose lower chamber is connected with a line 86 which branches off from a line 87. The line 87,—corresponding to line 26 of FIG. 1—on the one hand, is in communication with the connection 80 and, on the other, leads like line 83 to the other still present locking mechanisms which, however, are not illustrated in FIG. 3.

Both the lock 65 at the driver door (not shown) as also the lock 66 at the codriver door (not shown) include a lock cylinder 88 with two downwardly projecting entrainment members 89 and 90. Intermediate these entrainment members 89 and 90 projects an upwardly bent end of a locking rod 91 bent in the direction toward the lock cylinder 88, of which the one locking rod 91 associated with the lock 65, forms the piston rod with the pistons 92 and 93 of the valve 75 and in its extension represents an actuating rod 94 of a servomotor 95. Furthermore, this locking rod 91 accommodates or is operatively connected in a conventional manner with one leg of a bellcrank 96 pivotally arranged in a conventional manner in a lock housing, whose other leg is pivotally connected with a vertical, upwardly directed locking and unlocking rod 97 having an actuating knob 98. The servomotor 95 is subdivided into two chambers by a diaphragm 99 connected with the actuating rod 94, one chamber of servomotor 95 is connected by way of a line 100 with a connection 101 and the other chamber by way of a line 102 with a further connection 103 of the impulse valve 78.

The locking rod 91 associated with the lock 66 is pivotally connected to one leg of a bellcrank 104 rotatably supported in a conventional manner in its lock housing (not shown). The other leg of the bellcrank 104 accommodates or is operatively connected both with the bent end of a vertical, upwardly projecting locking and unlocking rod 105 having an actuating knob 106 as also with an entrainment plate 107. The entrainment plate 107 is angularly bent at its lower end and is provided with a bore which serves for the guidance of an intermediate rod 109 that is longitudinally displaceably supported with its bent upper end in an elongated aperture 108 of the entrainment plate 107. A spring 110 with two legs is received with its center part by the bent end of the intermediate rod 109, i.e., is mounted with its center part on the bend end of rod 109, whereas the two legs are anchored at the entrainment plate 107. A spring 112 surrounded by a sleeve 111 adjoins the lower end of the intermediate rod 109 and acts on an actuating rod 114 of the servomotor 85 provided with a diaphragm 113.

The operation of the locking installation will be explained hereinafter by reference to a central unlocking operation initiated from the driver door. If the lock cylinder 88 is displaced in the clockwise direction, as viewed in FIG. 3, for example, by means of a key, or if the actuating knob 98 is pulled upwardly, then the locking rod 91, the pistons 92 and 93 and the actuating rod 94 with the diaphragm 99 secured thereto are displaced toward the left. This becomes possible in that the two chambers of the servomotor 95 in the rest position of the impulse valve 78 are in communication with the atmospheric air, as a result of the spacing of pistons 116 and 117 and the venting of the housing portions containing springs 77. During the shifting operation, the two pistons 92 and 93 assume such a position that the line 83, which leads to the remaining servomotors (not shown), and the line 84 are connected with the vacuum line section 72. The diaphragm 113 and the actuating rod 114 of the servomotor 85 move in the upward direction and take along the sleeve 111, the spring 112, and the remaining locking members of the locking mechanism 66. The impulse valve 78 thereby does not enter into operation. This takes place when during short-timed rotation of the lock cylinder 88 at the codriver's door, for example, in the counterclockwise direction, a locking rod 115 pivotally mounted at the lock cylinder 88 and having two pistons 116 and 117 displaces the same against the resistance of the left spring 77. Simultaneously therewith, the locking rod 91 is displaced toward the right by the entrainment member 90 whereby a lifting of the locking and unlocking rod 105 and of the actuating knob 106 takes place by way of the bellcrank 104, which corresponds to a mechanical unlocking from the inside of the vehicle. During this operation takes place a snapping-over of the spring 110 in the manner of a toggle action, which then abuts at the lower end of the elongated aperture 108 because the diaphragm 113 has still maintained the illustrated position. This pulse valve 78 is then shifted and leads to an unlocking of the lock 65, when a connection of the line section 73 with the line 102 takes place. As a result of the displacement of the actuating rod 94 and of the two pistons 92 and 93 occurring thereby, the upper chamber of the servomotor 85 is, actuated with, i.e., subjected to vacuum by way of line 84 so that the diaphragm 113 and the adjoining members are displaced upwardly whereby again a snapping-over of the spring 110 takes place into the illustrated position. The spring 112 as also the springs 55 in FIG. 1 enable a locking by pushing down the respective actuating knob 106 or 45 for the locking of a door if the installation is centrally unlocked.

Also the locking installation illustrated in the centrally locked position in FIG. 4 for the actuation of the locks generally designated by reference numerals 118 and 119 of the vehicle front doors (not shown) is actuated by means of vacuum. For that purpose, the suction pipe 120 of a conventional internal combustion engine (not shown) is tapped by means of a line 121 which leads to a storage or reservoir tank 123 by way of a check valve 122. A further line 124 branching off from the line 121 leads to a center tap 125 of a control device generally designated by reference numeral 15 and constructed as valve 127 which is further provided with two connections 127 and 128. A line 129—corresponding to line 18 of FIG. 1—leads from the connection 127 to the various servomotors, not illustrated in this figure but visible in FIG. 1, for the locks of the rear doors and to the other locking mechanisms. A line 130 branching off from line 129 leads to the upper chamber of a servomotor 131 whose lower chamber is connected with a line 132 which, in turn, branches off from a line 133. The line 133—corresponding to line 26 of FIG. 1,—in its turn, is in communication with the connection 128 and on the other, like line 129 leads to the other locking mechanisms still connected thereto but not illustrated in FIG. 4. Both locks 118 and 119 are each provided with a lock cylinder 134 having two downwardly projecting entrainment members 135 and 136. One end of a locking rod 137 bent in the direction toward the lock cylinder 135 engages between the entrainment members 135 and 136 of a respective lock cylinder 134, of which the one locking rod 137 associated with the lock 118 forms the piston rod with the pistons 138 and 139 of the valve 126 and in its extension represents an actuating rod 140 for two electric coils 141 and 142 arranged one behind the other. Furthermore, this locking rod 137 accommodates or is operatively connected with one leg of a bellcrank 143 pivotally arranged in a lock housing (not shown), to the other leg of which is pivotally connected with a vertical, upwardly directed locking and unlocking rod 144 having an actuating knob 145. The locking rod 137 associated with the lock 119 is also pivotally connected with one leg of a bellcrank 146 rotatably supported in a lock housing (not shown), whose other leg accommodates or is operatively connected both with the bent end of a vertical, upwardly projecting locking and unlocking rod 147 having an actuating knob 148 as also with an entrainment plate 149. The entrainment plate 149 is angularly bent at its lower end and is provided with a bore which serves for the guidance of an intermediate rod 151, longitudinally displaceably supported with its angularly bent end in an elongated aperture 150 of the entrainment plate 149. A spring 152 with two legs is received with its center portion by the angularly bent end of the intermediate rod 151 whereas the two legs are anchored at the entrainment plate 149. A spring 154 surrounded by a sleeve 153 adjoins the lower end the intermediate rod 151 and acts on an actuating rod 156 provided with a diaphragm 155 of the servomotor 131. A push rod 157 with two downwardly directed extensions 158 and 159 is pivotally connected at the lock cylinder 134 for the lock 119. The rod 157 acts on a control device 160 having a conventional contact bridge 162, shown only schematically and connected by a line 161 with the positive terminal of a battery (not shown). The contact bridge 162 selectively influences, i.e., selectively establishes an electric circuit with two contacts 163 and 164 to which are connected lines 165 and 166, respectively, that lead to the positive side of a respective relay 167 and 168, which are both connected at the negative side thereof with the vehicle ground 169. If the relay 167 or 168 is energized, then a contact bridge 170 or 171 closes whereby by way of a line 172 or 173 the winding 141 or 142 which is connected on one side to the vehicle ground 169, receives a positive potential.

The operation of the installation of FIG. 4 corresponds in principle to the installation illustrated and described already in connection with FIG. 3. Only in place of the servomotor 95 with its two chambers according to FIG. 3, there are provided in FIG. 4 the two electric coils 141 and 142 which are adapted to be selectively energized by way of control switch 160 in conjunction with relays 167 and 168. The control switch 160 and the two relays 167 and 168 thus replace the valve 78 of FIG. 3.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A locking installation operable by vacuum for the central locking and unlocking and/or actuation of various locking mechanisms arranged in a vehicle, especially a motor vehicle, comprising: a continuous source of vacuum, servomotor means actuated by the vacuum operatively associated with each of said locking mechanisms for effecting locking and unlocking thereof; a first control means coordinated to the driver door of the vehicle for effecting the central locking and unlocking of the locking mechanisms by locking and unlocking, respectively, the driver door; first shifting valve means operatively associated with the first control means and under vacuum via conduit means in communication with said vacuum source; second control means coordinated to the codriver door of the vehicle for effecting the central locking and unlocking at a location within the passenger space that is accessible to the driver; second shifting valve means operatively associated with said second control means and under vacuum via said conduit means in communication with said vacuum source; said first and second control means each including lock cylinder means adapted to be rotated for locking or unlocking the driver and the codriver door, respectively, and for controlling the stroke movement of the first and second shifting valve means, respectively; said lock cylinder means each having downwardly projecting entrainment members engaging therebetween an end of a locking rod provided on each of said first and second valve shifting means, respectively; third control means coordinated to each door of the vehicle for mechanically locking or unlocking each door from the inside of the vehicle in the centrally unlocked or locked condition respectively; said third control means including actuating knobs associated with the locking mechanism of each door; and said first and second shifting valve means being operatively connected with the locking cylinder means or the actuating knob of the driver and codriver doors, respectively, whereby, depending on the actuation direction thereof, central locking or unlocking of all locking mechanisms is effected.

2. An installation according to claim 1, wherein the locking mechanism at the driver door and codriver door each include bellcrank means pivotally mounted at the lock housing with one leg of the bellcrank means pivotally connected with the respective locking rod and another leg of the bellcrank means pivotally connected to rod means of the respective actuating knob.

3. An installation according to claim 2, wherein each rod means is operatively connected with intermediate rod means which, in turn, is operatively associated with a U-shaped entrainment plate means, and an actuating rod of the respective servomotor means also being operatively associated with the U-shaped entrainment plate means.

4. An installation operable by vacuum for the central locking and unlocking and/or actuation of various locking mechanisms arranged in a vehicle, especially a motor vehicle, comprising: a continuous source of vacuum, servomotor means actuated by the vacuum operatively associated with each of said locking mechanisms for effecting locking and unlocking thereof; a first control means coordinated to the driver door of the vehicle for effecting the central locking and unlocking of the locking mechanisms by locking and unlocking, respectively, the driver door; first shifting valve means operatively associated with the first control means; second control means coordinated to the codriver door of the vehicle for effecting the central locking and unlocking at a location within the passenger space that is accessible to the driver; second shifting valve means operatively associated with said second control means; both the first and second shifting valve means including two pistons connected with a locking rod having a free end operatively coordinated to the respective first and second control means; a conduit communicating with the first and second shifting valve means and the source of vacuum; a first branching conduit means being connected to a chamber of the servomotor means of the rear vehicle doors, the codriver door, a luggage space locking mechanism, and the first shifting valve means; a second branching conduit means being connected to another chamber of the servomotor means of the rear vehicle doors, the codriver door, the luggage space locking mechanism, a tank lid locking mechanism and the first shifting valve means; and third control means coordinated to each door of the vehicle for mechanically unlocking each door from the inside of the vehicle in the centrally locked condition thereof.

5. An installation according to claim 4, wherein a third conduit is connected between a chamber of the servomotor of the driver door and the second shifting valve means, and a fourth conduit is connected between another chamber of the driver door servomotor and the second shifting valve means.

6. An installation operable by vacuum for the central locking and unlocking and/or actuation of various locking mechanisms arranged in a vehicle, especially a motor vehicle, comprising: a continuous source of vacuum; servomotor means actuated by the vacuum operatively associated with each of said locking mechanisms for effecting locking and unlocking thereof; a first control means coordinated to the driver door of the vehicle for effecting the central locking and unlocking of the locking mechanism by locking and unlocking, respectively, the driver door; first shifting valve means operatively associated with the first control means and under vacuum via conduit means in communication with said vacuum source; a second control means coordinated to the codriver door of the vehicle for effecting the central locking and unlocking at a location within the passenger space that is accessible to the driver; second shifting valve means operatively associated with said second control means and under vacuum via said conduit means in communication with said vacuum source; said first and second control means each including locking cylinder means adapted to be rotated for locking or unlocking the driver and the codriver door respectively and for controlling the stroke movement of the first and second shifting valve means respectively; a third control means coordinated to each door of the vehicle for mechanically locking or unlocking each door from the inside of the vehicle in a centrally locked or unlocked condition respectively; said third control means including actuating knobs associated with the locking mechanism of each door; the first and second shifting valve means each including a locking rod operatively connected with the locking cylinder means at the driver door and codriver door, respectively, said locking mechanism at the driver door and codriver door also each including bellcrank means pivotally mounted at the lock housing with the respective locking rod and another leg of the bellcrank means pivotally connected to rod means of the respective actuating knob, the rod means being operatively connected with intermediate rod means which in turn, is operatively guided in a first slotted aperture of an approximately U-shaped entrainment plate means, and an actuating rod of the respective servomotor means also being operatively guided in a second slotted aperture of the U-shaped entrainment plate means, and spring means being operatively arranged at the ends of the intermediate rod means and the respective actuating rod in the slotted apertures of the U-shaped entrainment plate means; said first and second shifting valve means thereby being operatively connected with the locking cylinder means or the actuating knob of the driver and codriver door, respectively, whereby, depending on the actuation direction thereof, central locking or unlocking of all locking mechanisms is effected.

7. An installation operable by a vacuum for the central locking and unlocking and/or the actuation of various locking mechanisms arranged in a vehicle, each of said locking mechanisms including a servomotor operated by a vacuum and means mechanically actuated individually from the interior of the vehicle, comprising: a continuous source of vacuum; a first control means arranged on the driver door of the vehicle for effecting the central locking and unlocking of said locking mechanisms by locking and unlocking of the driver door, said first control means including a first slide valve means operatively associated with the locking mechanism for the driver door and under a continuous vacuum via conduit means directly connected to said vacuum source and in communication via additional conduit means with the servomotor means of each of the other locking mechanisms; a second control means arranged on the codriver door of the vehicle at a point in the passenger space accessible to the codriver and to the driver for also effecting the central locking and unlocking operations; said second control means including a second slide valve means under continuous vacuum via conduit means directly connected to said source of vacuum and being in communication with the servomotor means of the locking mechanism of the driver door via additional conduit means; said second slide valve means being operatively associated with the locking mechanism of the codriver door and said slide valve means each being movable between two positions whereby said locking mechanisms are in the centrally unlocked condition when the slide valves are in one position and are in the centrally locked condition when the slide valves are in the other position and, whereby the vacuum is alternately applied to either one of the two chambers of each servomotor means for actuating the locking mechanisms of each of the doors of said vehicle.

8. An installation according to claim 7, wherein said third control means for mechanically unlocking the rear doors from the inside in bypassing relationship to the central locking action, whereby the rear doors can be unlocked even though the central locking installation is in the locked condition.

\* \* \* \* \*